Figure 1:
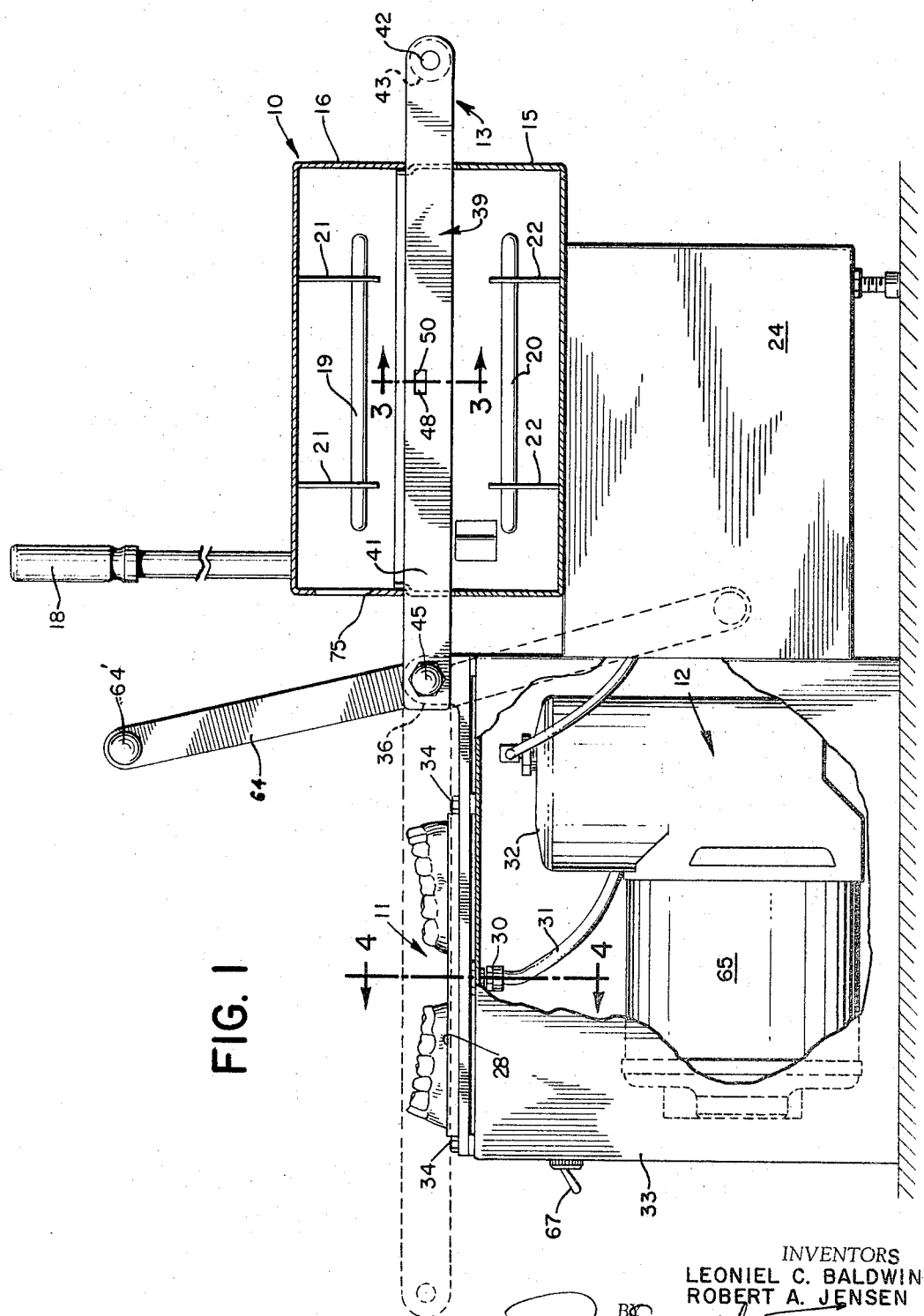

March 7, 1967  L. C. BALDWIN ETAL  3,307,222
VACUUM-FORMING APPARATUS

Filed Aug. 20, 1965  3 Sheets-Sheet 1

INVENTORS
LEONIEL C. BALDWIN
ROBERT A. JENSEN

BY

ATTORNEYS

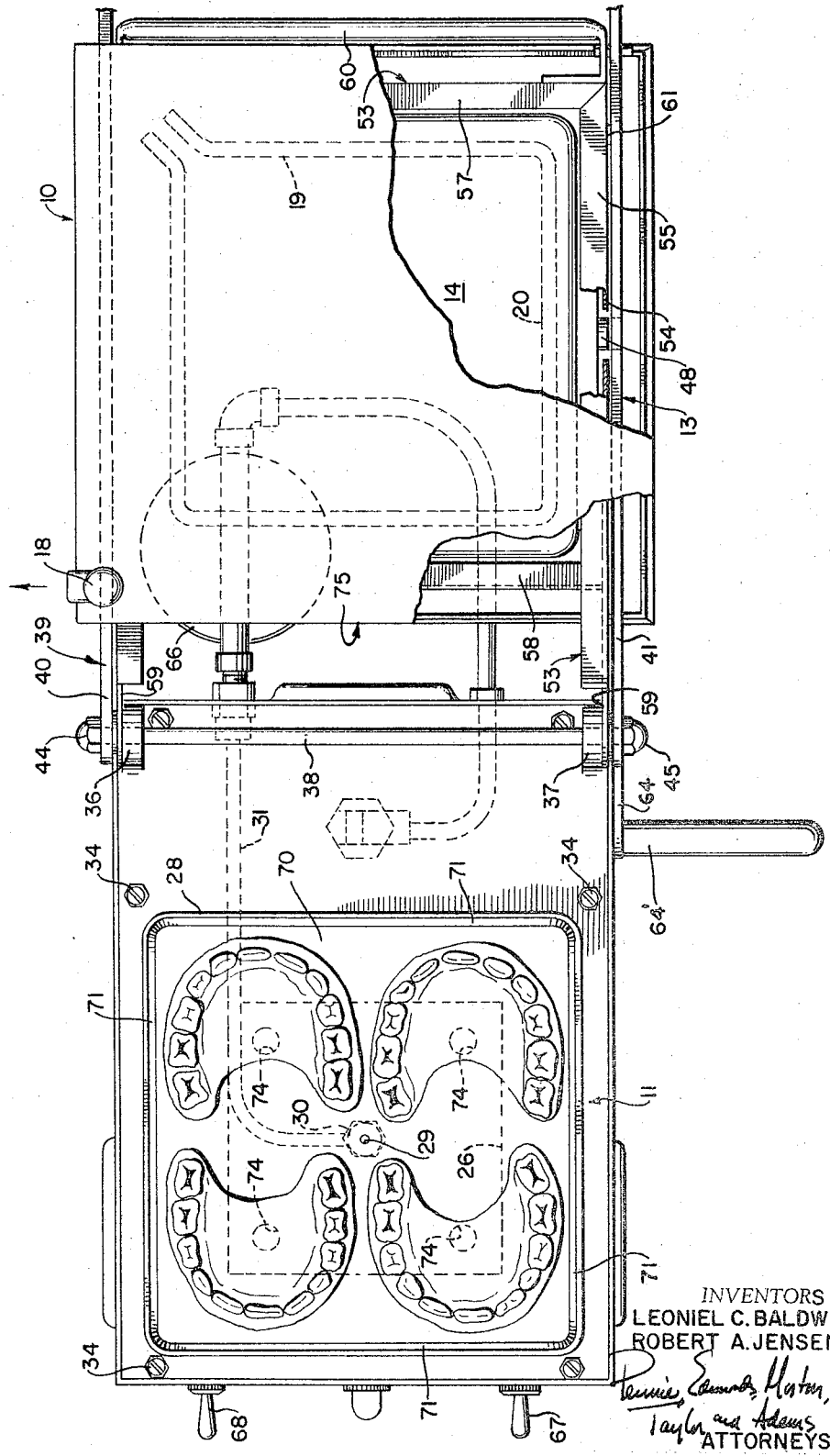

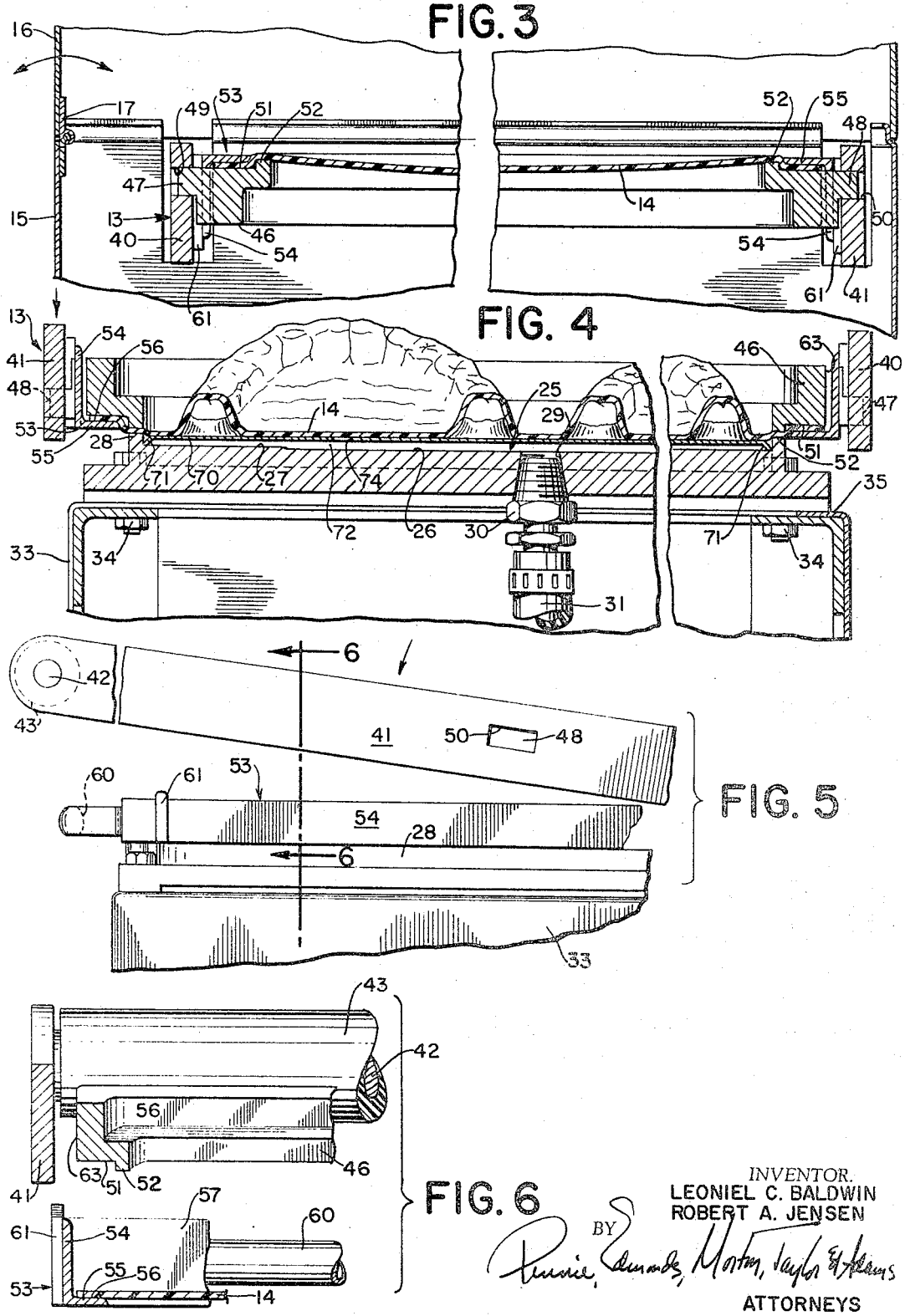

3,307,222
VACUUM-FORMING APPARATUS
Leoniel C. Baldwin, Toledo, Ohio, and Robert A. Jensen, Dolton, Ill., assignors to Howe Sound Company, a corporation of New Jersey
Filed Aug. 20, 1965, Ser. No. 481,223
5 Claims. (Cl. 18—19)

This invention relates to vacuum-forming apparatus, and more particularly, it relates to apparatus for use in vacuum-molding precision dental appliances and like precision articles from thermoplastic sheet materials.

In the fabrication of dental appliances, such as custom impression trays, clear surgical trays, try-in baseplates, stabilized bases, custom-made mouth protectors, and bruxism splints, it is essential for the dental technician to have apparatus capable of softening a thermoplastic sheet and adapting it to a dental model so that it conforms to even the most minute impressions on the dental model. This first molding operation is essential to forming a dental appliance having the dimensional accuracy necessary to form a quality appliance. The apparatus presently in use in the dental lab is inadequate in that it is incapable of employing all the accepted thermoforming principles. It is, therefore, the object of the invention to provide a heavy-duty production type vacuum-forming machine which is designed for laboratory use for the molding of thick or thin thermoplastic sheet materials over plastic or stone models and utilizes the most advanced principles of thermoforming.

Basically these principles are first to uniformly heat a sheet of thermoplastic material so that it softens and begins to drape at the center, and using the drape as an indicator of the softening which has been effected, the sheet material is immediately placed over the model and adapted to the model by placing it fully over the model with a uniform downward pressure. A seal is then effected between a peripheral portion of the sheet and a molding platform on which the model is positioned, and a vacuum is created between the sheet and the molding platform so that the sheet is closely adapted to the model to vacuum-form the appliance.

We have invented vacuum-forming apparatus for use in vacuum-molding precision articles such as dental appliances of the hand-operated type in which a sheet of thermoplastic material is placed in a frame, heated to soften and then applied about a model where it hardens to the desired shape. Broadly stated our apparatus is comprised of an oven having heating elements separably mounted therein to define a space therebetween into which a sheet of thermoplastic material can be located for softening and a molding platform mounted adjacent the oven for supporting a model, which platform has vacuum pump means operatively connected to it. A clamping frame, which has means for holding a sheet of material to it is pivotally mounted between the oven and the platform to pivot to a first heating position beween said heating elements and a second molding position adjacent said molding platform. Pressure frame means are provided in said clamping frame for pressing a peripheral portion of said sheet material against said platform during molding to seal it therebetween, and means are also provided for separating the spaced heating elements so that the frame can be pivoted to position the sheet material in and out of said first position. It is also intended to include means on said frame against which hand pressure can be applied to the frame in the molding position to seal the peripheral portion of the material between the pressure frame about the model.

A preferred embodiment of the invention is described hereinbelow with reference to the drawings wherein:

FIG. 1 is a side elevation of the apparatus partly in section and partly broken away;
FIG. 2 is a plan view, partly broken away of the apparatus;
FIG. 3 is a section taken along lines 3—3 of FIG. 1;
FIG. 4 is a section taken along lines 4—4 of FIG. 1;
FIG. 5 is a side elevation of the sheet material being locked into the clamping frame at the molding platform; and
FIG. 6 is a section taken along lines 6—6 of FIG. 5.

The apparatus consists basically of an oven 10, a molding platform 11 with a vacuum pump 12 operatively connected to it, and a frame 13 mounted to hold a sheet of thermoplastic material 14 in position for both softening and molding.

The oven 10 is comprised of a substantially closed boxlike construction having a bottom section 15 and a top section 16. The top section is attached to one side of the bottom section by hinges 17, as shown in FIG. 3, to permit the top to swing open completely so that the frame 13 can be pivoted into the oven and quickly removed from it. A handle 18 is attached to the side of the top section at which it is hinged to the bottom section; the handle is used to swing the top section laterally from the bottom section to expose the bottom section completely. Mounted in the oven top section 16 and bottom section 15 respectively are top and bottom heavy-duty heating elements 19 and 20, preferably of 600 watts each. The top heating element 19 is mounted in the oven top section 16 by supporting brackets 21 and will swing with the top when it is opened. The bottom heating element 20 is mounted in the oven bottom 15 by supporting brackets 22. The heating elements 19 and 20 are generally rectangular shaped elements, as indicated in FIG. 2, and when the oven is closed they are in parallel spaced relationship so that a sheet of thermoplastic material inserted therebetween will be rapidly and uniformly heated and softened. The oven 10 is mounted on a supporting cabinet 24 which houses an air filter and moisture trap and supports the oven so that the space between the heating elements lies substantially in the same plane as the molding platform.

The molding platform 11 is characterized by a graduated depth molding surface 25 which has a middle flat surface 26, a slightly raised intermediate flat surface 27 marginally surrounding the middle flat surface, and a peripheral rectangular raised ridge portion 28 extending completely around the intermediate flat surface and raised from it. A vacuum exhaust outlet opening 29 opens into the platform surface into the middle flat surface 26. A vacuum hose fitting 30 is threaded into the outlet opening 29 and a vacuum line hose 31 leads into a vacuum pump 32. The vacuum pump is housed in a cabinet 33 directly beneath the platform 11, and the platform 11 is supported on the cabinet and held fixed thereon by standard bolts and nuts 34 which extend through portions of the platform along its four corners and through a top edge 35 of the cabinet.

Extending integrally from the corners of the end of the platform adjacent the oven are a pair of supports 36 and 37, as best shown in FIG. 2, through which a shaft 38 is journaled. Mounted on the shaft 38 is a handle assembly 39 which is comprised of a pair of parallel spaced flat support arms 40 and 41 which have a handle bar 42 extending across the opening at the end of the arms opposite to the end mounted on the supports 36 and 37 and a fiber tube 43 which surrounds the handle bar. Cap nuts 44 and 45 are threaded on the end of the shaft 38 for holding the arms on the shaft between the supports 36 and 37 and the cap nuts.

The handle assembly 39 provides a means for supporting a clamping frame assembly therebetween which is designed to hold a sheet of thermoplastic material in position to be molded. The clamping frame assembly consists of a pressure frame 46 which is generally rectangular shaped member with lateral extensions 47 and 48 extending from opposite sides thereof. The lateral extensions are dimensioned to fit into slots 49 and 50 which are formed at the mid-point of each of the arms 41 and 42 so as to hold the pressure frame between the arms. The frame section, as shown in FIG. 3 positioned in the oven and in FIG. 4 positioned against the molding platform, defines a flat marginal surface area 51 extending inwardly from the peripheral edge of the pressure frame and a raised rectangular ridge potion 52 along the innermost marginal edge of the pressure frame. As will be seen, the pressure frame ridge portion 52 and the platform ridge portion 28 are dimensionally the same so that they will come into opposed relationship to each other when the frame assembly is brought into its molding position.

Another member of the frame assembly is a sheet supporting frame 53 which is constructed to hold the plastic sheet to the pressure frame in the assembly. The sheet frame is generally L-shaped in section with upright portions 54 of slightly larger diameter than the pressure frame and an inwardly extending portion 55 which defines flat marginal surface 56 which is dimensioned to be positioned in opposition to the flat surface 51 of the pressure frame. The marginal surface 56 defines a rectangular marginal surface in which the marginal edges of the plastic sheet 14 can be positioned. Therefore, cross members 57 and 58 are provided on the frame to complete the frame construction. The upright side portions 54 along two sides of the frame are pivotally mounted on the rod 38 to swing on a horizontal axis at one end portion 59 and at the opposite end have a handle 60 welded thereto. Also, as shown in FIGS. 2, 5 and 6, mounted to the outer surface of the upright portions 54 along the two sides of the frame and spaced back slightly from the handle 60 end of the frame are T-clips 61 which give added width to the frame at this point. Thus, in assembly, the plastic sheet is positioned in the sheet frame with its marginal edges resting on the flat surface 56. The pressure frame is brought down against the plastic sheet and hand pressure is applied on handle bar 42 so that a peripheral portion of the sheet inwardly spaced from the marginal edges which are held between the sheet and pressure frames is tightly held between the flat surface 56 of the sheet frame and the flat surface area 51 of the pressure frame to seal the sheet material in relation to the molding platform and thereby effectively complete a vacuum chamber. The T-clips wedge the upright portions 54 between the arms 40 and 41 and the side edge 63 of the pressure frame so that all these parts are held fixed together. The sheet material is then in position to be molded. Another integral part of the frame assembly is a hand lever 64 which is welded to one arm 41 of the handle assembly with a handle 64' extending laterally therefrom and extends in a position so that it is within reach from the front of the cabinet 33 when the frame asembly is in the oven.

The vacuum pump apparatus is standard and as shown consists of a vacuum pump 32 to which a motor 65 is connected. The vacuum line tubing leads to the vacuum pump 32 through a filter 66. A first toggle switch 67 is positioned on the front of the cabinet 33 for controlling the vacuum pump and a second toggle switch 68 is provided also on the front of the cabinet for controlling the oven.

The apparatus shown is set up for molding four appliances simultaneously. In this arrangement a four-hole adaptor plate 70 is positioned on the platform. This plate is a substantially flat member with the marginal edges 71 crimped down to abut substantially against the inner sides of the raised ridge and to provide a supporting edge to hold the plate spaced from the molding platform surfaces. By this means a secondary vacuum chamber 72 is provided beneath the adpator plate and a vacuum exhaust outlet is effected through each of four holes 74 in the plate.

In operation, the sheet of thermoplastic material is placed into the sheet frame, and by grasping the handle bar 42 and the handle 60, the pressure frame is brought into locking engagement with the sheet frame; thus assembled, the clamping frame assembly is raised with one hand and the top section 16 of the oven is swung open by laterally swinging the handle 18 with the other hand. With the bottom section of the oven exposed, the clamping frame is lowered into the oven with the aid of the hand lever 64. When the clamping frame is resting on the bottom section of the oven, the top section of the oven is closed by using the handle 18. Now the thermoplastic material is spaced substantially equidistant between the heating elements 19 and 20 and will insure uniform heating.

While the material is being heated, the previously prepared models are positioned over the respective holes in the insert plate. The heating of the material is then observed through a slot 75 in the oven front. As the material softens, it will begin to sag or drape in the center. The amount of drape is used as an indicator to determine when the material is ready to mold. As a general rule, each two mil of sheet thickness will require one second of heating time. When the heat-softened material has draped the required amount, the oven is opened and the material is transferred to the molding platform by using the hand lever 64. As the heat-softened material is positioned over the models on the molding platform, the handle bar 42 is grasped with the left hand, and the vacuum pump switch is turned on with the right hand. Both hands can then be used to press the clamped material over the models and firmly against the molding platform. As shown in FIG. 4 the material becomes clamped between the rim 28 of the molding platform and the pressure frame rim thereby effecting a seal so that air is evacuated beneath the sheet material and a vacuum is effected between the models and the material so that the heat-softened material is closely adapted to the model. Pressure is maintained by holding the material firmly against the rim of the molding platform until the sheet has cooled sufficiently to become hard or set. Depending upon the material type and thickness about 10–90 seconds is required. The pressure frame is then separated from the sheet material frame and the vacuum pump is turned off. The now molded sheet material can be removed, trimmed and finished.

Although the apparatus is described in relationship to molding of four models, the apparatus can be used for a single model molding as well. This is possible with this apparatus because of the graduated surface molding platform. A different pressure frame with a smaller opening and a higher rim is simply inserted into the clamping frame and a matching insert plate is attached to the molding platform; the apparatus then is prepared for single moldings with smaller plastic sheets.

We claim:
1. Vacuum-forming apparatus for use in vacuum-molding precision articles from thermoplastic sheet materials comprising:
   (a) an oven located in the back portion of said apparatus having heating elements separably mounted therein to define a space therebetween into which a sheet of said material can be located for softening,
   (b) a molding platform mounted adjacent said oven in the front portion of the apparatus,
   (c) vacuum pump means operatively connected to said platform,
   (d) a clamping frame having means for holding a sheet of said material, said frame pivotally mounted about a horizontal axis extending laterally across said apparatus between said oven and said platform to pivot backward to a first heating position between said heating elements and frontward to a second molding position adjacent said molding platform, (e) pressure frame means in said clamping frame for pressing a peripheral portion of said sheet material against said platform during molding to seal it therebetween upon application of pressure on said pressure frame downward against said platform, (f) means for separating said spaced heating elements so that said frame can be pivoted to position said sheet material in and out of said first position, and (g) lever means connected to said frame and extending frontward therefrom toward said molding platform when said frame is in said first position and initially pivoting said frame toward said second position to the front of the apparatus out of the oven.

2. Vacuum-forming apparatus for use in vacuum-molding precision articles from thermoplastic sheet materials comprising:

(a) an oven located in the back portion of said apparatus having separable top and bottom sections with heating elements mounted in each and defining a space therebetween in the closed position into which a sheet of said material can be located for softening, (b) a molding platform mounted adjacent said oven in the front portion of the apparatus, (c) vacuum pump means operatively connected to said platform, (d) a clamping frame having means for holding a sheet of said material, said frame pivotally mounted about a horizontal axis extending laterally across said apparatus between said oven and said platform to pivot backward to a first heating position between said heating elements and frontward to a second molding position adjacent said molding platform, (e) pressure frame means in said clamping frame for pressing a peripheral portion of said sheet material against said platform during molding to seal it therebetween upon application of pressure on said pressure frame downward against said platform, (f) means on said frame against which hand pressure can be applied to the frame in the molding position to seal the peripheral portion of the material between the pressure frame and the molding platform, (g) means for separating said top and bottom sections so that said frame can be pivoted to position said sheet material in and out of said first position, and (h) lever means connected to said frame and extending frontward therefrom toward said molding platform when said frame is in said first position and initially pivoting said frame toward said second position to the front of the apparatus out of the oven.

3. Vacuum-forming apparatus for use in vacuum-molding precision articles from thermoplastic sheet materials comprising:

(a) an oven located in the back portion of said apparatus having heating elements separably mounted therein to define a space therebetween into which a sheet of said material can be located for softening, (b) a molding platform mounted adjacent said oven in the front portion of the apparatus, (c) vacuum pump means operatively connected to said platform, (d) a clamping frame having support arms pivotally mounted about a horizontal axis extending laterally across said apparatus between said oven and said platform to pivot backward to a first heating position between said heating elements and frontward to a second molding position adjacent said molding platform, a sheet frame for holding the thermoplastic sheet, and a pressure frame mounted on said arms and attachable to said sheet frame with the sheet therebetween and configured for pressing a peripheral portion of said sheet against said platform during molding upon application of pressure on said pressure frame downward against said platform, (e) means on said frame against which hand pressure can be applied to the frame in the molding position to seal said peripheral portion of the material between the pressure frame and the molding platform, (f) means for separating said spaced heating elements so that said frame can be pivoted to position said sheet material in and out of said first position, and (g) lever means connected to said frame and extending frontward therefrom toward said molding platform when said frame is in said first position and initially pivoting said frame toward said second position to the front of the apparatus out of the oven.

4. Vacuum-forming apparatus for use in vacuum-molding precision articles from thermoplastic sheet materials comprising:

(a) an oven located in the back portion of said apparatus having separable top and bottom sections with heating elements mounted therein and defining a space therebetween in the closed position into which a sheet of said material can be located for softening, (b) a molding platform mounted adjacent said oven in the front portion of the apparatus and defining a molding surface, (c) vacuum pump means operatively connected to said platform, (d) a clamping frame having support arms pivotally mounted about a horizontal axis extending laterally across said apparatus between said oven and said platform to pivot backward to a first heating position between said heating elements and frontward to a second molding position adjacent said molding platform, a sheet frame for holding the thermoplastic sheet, and a pressure frame mounted on said arms with the sheet therebetween, said pressure frame having a raised peripheral ridge projecting from said frame for holding a peripheral portion of said sheet material between it and molding platform and effecting a seal therebetween upon application of pressure on said pressure frame downward against said platform, (e) a handle on said frame against which hand pressure can be applied to the frame in the molding position to seal said peripheral portion of the material between the pressure frame and the molding platform, (f) means for separating said top and bottom sections so that said frame can be pivoted to position said sheet material in and out of said first position, and (g) lever means connected to said frame and extending frontward therefrom toward said molding platform when said frame is in said first position and initially pivoting said frame toward said second position to the front of the apparatus out of the oven.

5. Vacuum-forming apparatus for vacuum-molding precision articles from thermoplastic sheet materials comprising:

(a) an oven located in the back portion of said apparatus having separable top and bottom sections with heating elements mounted thereon in parallel spaced relationship and defining a space therebetween in the closed position into which a sheet of said material can be located for softening, (b) a molding platform mounted adjacent said oven in the front portion of the apparatus and defining a molding surface with a raised marginal ridge extending therefrom, said surface within said ridge being graduated in depth, said molding platform surface and said space between the heating element being substantially uniplanar, (c) vacuum pump means connected to said platform with a vacuum exhaust outlet opening into said molding surface at the deepest portion thereof, (d) a clamping frame assembly having parallel spaced support arms pivotally mounted about a horizontal axis extending laterally across said apparatus between said oven and said platform to pivot backward to a first heating position between said heating elements and frontward to a second molding position adjacent said molding platform, a sheet frame for holding the thermoplastic sheet mounted between said arms, a pressure frame mounted on said arms with the sheet therebetween, said pressure frame having a raised peripheral ridge projecting from said frame for holding a peripheral portion of said sheet material between it and one of said ridge and said graduated surfaces of the molding platform in its molding position to effect a seal therebetween upon application of pressure on said pressure frame downward against said platform, (e) a handle on said arms against which hand pressure can be applied to the frame in the molding position to seal said peripheral portion of the sheet material between the pressure frame and the molding platform, (f) means for swinging said top section of the oven and one of said heating elements laterally away from said bottom section so that said frame can be pivoted to position said sheet material in and out of said first position, and (g) lever means connected to said frame and extending frontward therefrom toward said molding platform when said frame is in said first position for initially pivoting said frame toward said second position out of the oven and bringing said handle within reach at the front of the apparatus.

References Cited by the Examiner
UNITED STATES PATENTS

| | | | |
|---|---|---|---|
| 2,814,074 | 11/1957 | Butzko | 18—19 |
| 2,836,852 | 6/1958 | Butzko | 18—19 |
| 3,025,566 | 3/1962 | Kostur | 18—19 |
| 3,072,964 | 1/1963 | Tilden | 18—19 |
| 3,081,491 | 3/1963 | Black | 18—19 |
| 3,167,816 | 2/1965 | Howard | 18—19 |
| 3,179,980 | 4/1965 | Ryan et al. | 18—19 |

WILLIAM J. STEPHENSON, *Primary Examiner.*